US012797167B2

(12) United States Patent
Yu et al.

(10) Patent No.: US 12,797,167 B2
(45) Date of Patent: Nov. 17, 2026

(54) GUIDE PLATE STRUCTURE FOR INJECTING FLOWABLE COMPOSITE RESIN AND MANUFACTURING METHOD THEREOF

(71) Applicant: Sichuan University, Chengdu (CN)

(72) Inventors: Haiyang Yu, Chengdu (CN); Zhicheng Yin, Chengdu (CN); Qianrong Xiang, Chengdu (CN); Chenyang Xie, Chengdu (CN)

(73) Assignee: Sichuan University, Chengdu City (CN)

( * ) Notice: Subject to any disclaimer, the term of this patent is extended or adjusted under 35 U.S.C. 154(b) by 58 days.

(21) Appl. No.: 18/810,008

(22) Filed: Aug. 20, 2024

(65) Prior Publication Data

US 2025/0205025 A1 Jun. 26, 2025

(30) Foreign Application Priority Data

Dec. 20, 2023 (CN) ......................... 202311760332.5

(51) Int. Cl.
*A61C 13/20* (2006.01)
*B29C 33/38* (2006.01)
(Continued)

(52) U.S. Cl.
CPC ........ *A61C 13/206* (2013.01); *B29C 33/3835* (2013.01); *B29C 33/3842* (2013.01);
(Continued)

(58) Field of Classification Search
CPC . A61C 13/206; A61C 13/087; A61C 13/0019; A61C 9/00; A61C 5/85; A61C 5/82; A61C 5/77
See application file for complete search history.

(56) References Cited

U.S. PATENT DOCUMENTS

| | | | | |
|---|---|---|---|---|
| 2,727,307 A * | 12/1955 | Clark | A61C 9/00 | 433/73 |
| 6,302,689 B1 * | 10/2001 | Mayo | A61C 9/0006 | 433/37 |
| 2011/0129787 A1 * | 6/2011 | Darnell | A61C 9/0006 | 433/214 |

FOREIGN PATENT DOCUMENTS

| | | | |
|---|---|---|---|
| CN | 213641303 U | 7/2021 | |
| CN | 219048888 U | 5/2023 | |
| EP | 1029514 A1 * | 8/2000 | A61C 9/0006 |

OTHER PUBLICATIONS

Yu, Haiyang, et al., Minimal invasive microscopic tooth preparation in esthetic restoration: a specialist consensus, International Journal of Oral Science, vol. 11, Issue 31 (2019), 11 pages. (Year: 2019).*
(Continued)

*Primary Examiner* — Matthew J Daniels
(74) *Attorney, Agent, or Firm* — SALIWANCHIK, LLOYD & EISENSCHENK

(57) ABSTRACT

The present discloses a guide plate structure for injecting a flowable composite resin. The guide plate structure includes a rigid guide plate shell and a soft lining, a plurality of overflow holes are formed on the guide plate shell. The guide plate shell is provided with an injection channel used for injecting a flowable composite resin. A method for manufacturing a guide plate structure for injecting a flowable composite resin is further disclosed, including: S1, manufacturing a wax pattern model; S2, manufacturing a guide plate shell; S3, manufacturing a lining; S4, correcting an edge of the guide plate shell; and S5, cleaning a soft material in an injection channel on the guide plate shell. The present disclosure can resolve the problem of difficulties in placement and displacement of a guide plate when a resin is injected to restore an undercut of a tooth, and improve molding precision of the restoration.

4 Claims, 6 Drawing Sheets

(51) Int. Cl.
*B29K 83/00* (2006.01)
*B33Y 80/00* (2015.01)

(52) U.S. Cl.
CPC .. *B29K 2083/00* (2013.01); *B29K 2995/0026* (2013.01); *B33Y 80/00* (2014.12)

(56) References Cited

OTHER PUBLICATIONS

Gao, Jing, et al., A stereolithographic template for computer-assisted teeth preparation in dental esthetic ceramic veneer treatment, J. Esthet. Restor. Dent., vol. 32 (2020), pp. 763-769. (Year: 2020).*

English translation of CN-213641303-U, (Jul. 9, 2021), 5 pages. (Year: 2021).*

* cited by examiner

GUIDE PLATE STRUCTURE FOR INJECTING FLOWABLE COMPOSITE RESIN AND MANUFACTURING METHOD THEREOF

CROSS-REFERENCE TO RELATED APPLICATION

This application claims the benefit of Chinese Application No. 202311760332.5, filed Dec. 20, 2023, the disclosure of which is incorporated by reference herein in its entirety.

TECHNICAL FIELD

The present disclosure relates to the field of oral direct composite resin restoration technologies, and in particular to a guide plate structure for injecting a flowable composite resin and a manufacturing method thereof.

BACKGROUND

Dental defects are one of common oral diseases. Long-term dental defects have adverse effects on chewing, facial appearance, development, dental pulp, periodontal tissues, and even general health. Restoration of the dental defects usually uses composite resin filling for treatment, but traditional direct composite resin restoration is highly dependent on experience of doctors, which is technically sensitive and difficult in operation, and is a difficult problem for most dental doctors.

As flowable composite resin is popularized in dentistry, the use of the flowable composite resin for direct dental restoration has become a relatively mature technology. The use of a 3D printing guide plate for flowable composite resin injection can properly resolve the problems that the direct composite resin restoration is highly technically difficult, time-consuming, and difficult to achieve high-precision restoration. However, an existing 3D printing guide plate is usually a rigid guide plate, and due to a low deformation rate, the rigid guide plate is difficult to be removed after being put into an undercut of teeth, resulting in difficult displacement after resins are cured. To resolve the problem of difficult displacement of the guide plate, the utility model patent application No. CN202022677342.0 discloses a 3D printing guide plate for injecting a flowable composite resin, and the guide plate uses a design of a buccal (labial) guide plate and a lingual (palatal) guide plate, so that guide plates can be disassembled sequentially after injection, which resolves the problem of difficulties in displacement after injection for restoration of an undercut area to some extent. However, because of the use of the design of the buccal (labial) guide plate and the lingual (palatal) guide plate, the guide plate is prone to floating and spreading out during injection, resulting in poor molding precision. In addition, such a design leads to overflow of more resins from an edge of the guide plate, which is unfavorable for subsequent trimming by doctors. The utility model patent application No. CN202223567639.7 discloses a user-friendly guide plate for injecting a flowable composite resin. The guide plate is provided with a rigid guide plate outer layer and a soft guide plate inner layer, and soft and rigid parts of the guide plate are integrally formed through 3D printing. Although such a guide plate can resolve the problem of difficulties in displacement after injection for restoration of an undercut area, such a processing manner has extremely high requirements for 3D printing equipment, and production costs are extremely high. Therefore, the processing manner is impractical for popularization at the present stage. Due to limitation of 3D printing precision and some errors in CAD design and production, it is impossible to achieve perfect reproduction of an inner surface of the guide plate, and there are still the problems of excessive overflow from an edge of the guide plate and the poor surface quality of restorations.

SUMMARY

The present disclosure provides a guide plate structure for injecting a flowable composite resin and a manufacturing method thereof, to resolve a problem of difficulties in placement and displacement of a guide plate when a resin is injected to restore an undercut of a tooth, and improve molding precision of the restoration.

The present disclosure is implemented by using the following technical solution: a method for manufacturing a guide plate structure for injecting a flowable composite resin, including the following steps:

S1, manufacturing a wax pattern model: obtaining intraoral data or an intraoral model of a patient, and manufacturing the wax pattern model based on the obtained data or model;

S2, manufacturing a rigid guide plate shell:

S21, importing data of the wax pattern model through 3D design software to form a virtual wax pattern, and designing a shape of the guide plate shell according to a standard procedure in the software, where an inner surface of the guide plate shell matches a surface of the virtual wax pattern;

S22, reserving a gap between the guide plate shell and the virtual wax pattern;

S23, designing an injection channel, a termination point and overflow holes on the guide plate shell, where the injection channel is located at a tooth position in an injection area covered by the guide plate shell, and a bottom of the injection channel ends at a surface of a tooth position in an injection area of the virtual wax pattern; the termination point is located at a tooth position in a non-injection area covered by the guide plate shell, and a bottom of the termination point ends at a surface of a non-injection tooth position of the virtual wax pattern; and a plurality of overflow holes are provided, and the plurality of overflow holes are distributed on a surface of the guide plate shell; and

S24, exporting data of a designed guide plate shell, and then processing to manufacture a rigid guide plate shell through resin 3D printing;

S3, manufacturing a lining: injecting a soft flowable composite material into an inner side of the rigid guide plate shell, and then turning the guide plate shell containing the soft flowable composite material through impression to place the inner side of the guide plate shell on the wax pattern model manufactured in S1, where at this time, the termination point on the guide plate shell is in contact with the surface of the tooth position in the non-injection area on the wax pattern model, the injection channel on the guide plate shell is in contact with the surface of the tooth position in the injection area on the wax pattern model, the soft flowable composite material is distributed between the rigid guide plate shell and the wax pattern model and is in close fit to form a soft lining, and an excessive soft flowable composite material overflows from the overflow holes of the guide plate shell to embed the formed soft lining in the guide plate shell;

S4, correcting an edge of the guide plate shell: after the lining manufactured in S3 is cured, correcting along the edge of the guide plate shell to remove the excessive soft flowable composite material; and S5, cleaning the soft flowable composite material in the injection channel on the guide plate shell.

The rigid guide plate shell can limit deformation of a soft material, so that injection molding precision is effectively improved. In this solution, the lining made of a soft material is manufactured by injecting the soft material into an inner cavity of the rigid guide plate shell, and then is printed on the wax pattern model through impression. Because the soft material has good flowability, a surface structure of a dental prosthesis can be finely reproduced when the soft material is in contact with the surface of the wax pattern model, to effectively perform more accurate matching based on dental defects of different patients, for example, perform perfect fit based on thicknesses, areas, and different shapes of the dental defects of the patients. When a to-be-restored surface of a defect is very small, it is possible to implement more accurate restoration for a patient with an extremely thin dental defect position by reducing a volume of a molding cavity formed by the soft material or making a wax pattern model very thin. The manufacturing method in this solution has a wide application range, and is applicable to restoration of dental defects with various shapes, sizes, and thicknesses, and can effectively improve restoration precision, thereby improving restoration quality.

The arrangement of the termination point in this solution can ensure thickness uniformity of the soft material, assist in placement and stabilization of the rigid guide plate shell during injection restoration performed in a mouth of a patient and during manufacturing of the lining, minimize deformation of the soft material, and implement combination of the soft material and the rigid guide plate shell, to prevent an increase of interfaces from affecting precision.

Further, the surface of the wax pattern model is polished before the lining is manufactured in step S3, and the surface of the wax pattern model is coated with a separating agent and blown dry for later use.

Beneficial effects: Such arrangement allows the lining to be easily demolded and separated from the wax pattern mold after curing, and ensures smooth surfaces of the molding cavity and a curing cavity of the lining, so that the quality of later restoration can be improved.

Further, the edge of the guide plate shell is located at a gingival margin during the manufacturing of the guide plate shell in step S2.

Beneficial effects: Such arrangement allows the guide plate shell to fit more closely with an intraoral tooth position of a patient during later restoration, and avoids excessive overflow of the flowable composite resin injected during the restoration.

Further, the soft flowable composite material is a transparent silicone rubber material. The material has good elastic deformability, can be easily placed onto and displaced from teeth, and can more effectively give play to the advantages of the injection guide plate, especially for teeth with large undercuts.

A guide plate structure for injecting a flowable composite resin is formed by using the foregoing method for manufacturing a guide plate structure for injecting a flowable composite resin, the guide plate structure for injecting a flowable composite resin includes a guide plate shell and a lining, the guide plate shell is a rigid guide plate shell, the lining is a soft lining, a plurality of overflow holes are formed on the guide plate shell, the soft lining is located on an inner side of the rigid guide plate shell and fixedly connected to the rigid guide plate shell in an embedded mode, the guide plate shell is provided with an injection channel used for injecting a flowable composite resin, a non-injection area on an inner surface of the lining is provided with a fixing cavity, and an injection area on the inner surface of the lining is provided with a molding cavity.

Beneficial effects: The guide plate structure in this solution is formed by combining the guide plate shell and the lining to form a soft-rigid combined guide plate structure, which can effectively resolve the problem of difficulties in placement and displacement of the guide plate structure when a flowable composite resin is injected to restore an undercut of a tooth. In addition, the soft lining has certain elasticity, can be easily placed onto and displaced from teeth, and can more effectively give play to the advantages of the injection guide plate structure, especially for teeth with large undercuts.

Further, each axial surface of each tooth position in the non-injection area is correspondingly provided with a termination point.

Beneficial effects: The termination point can further ensure thickness uniformity of the soft material, and assist in placement of the rigid guide plate shell on the wax pattern model during manufacturing of the soft lining, thereby improving restoration precision and quality.

Further, a tooth position in a non-injection area covered by the inner surface of the guide plate shell is provided with a termination point, and the termination point is a columnar protrusion in contact with a surface of a non-injection resin restoration area.

Beneficial effects: Such arrangement can improve matching between the termination point and the surface of the tooth position, thereby improving restoration precision and quality.

Further, the overflow holes are evenly distributed on the guide plate shell, the overflow holes are conical holes, one end, located on an inner surface of the guide plate shell, of the overflow hole is an inner circle, the other end, located on an outer surface of the guide plate shell, of the overflow hole is an outer circle, and a diameter of the outer circle of the overflow hole is larger than that of the inner circle of the overflow hole.

Beneficial effects: This solution can ensure that the soft lining can be firmly embedded in the guide plate shell, tightness of the combination of the lining and the guide plate shell can be improved, and overall quality and precision of the guide plate structure can be improved.

Further, the bottom of the injection channel on the guide plate shell has a shape matching a surface shape of the tooth position in the injection area.

Beneficial effects: In this solution, the matching between the injection channel and the surface of the tooth position can be improved, thereby improving restoration quality and accuracy.

Compared with the conventional technology, the present disclosure has the following advantages and beneficial effects:

1. Resolve the problem of difficulties in placement and displacement of the guide plate when a resin is injected to restore an undercut of a tooth: The soft lining has certain elasticity, can be easily placed onto and displaced from teeth, and can more effectively give play to the advantages of the injection guide plate, especially for teeth with large undercuts.
2. Resolve the problem of poor surface quality of a prosthesis after injection: A soft material is used to reproduce a smooth surface of a wax pattern or digital model, to serve as the lining of the guide plate shell, and a prosthesis injection-molded with the soft material has a highly smooth surface, which can reduce workload of polishing the prosthesis in clinical practice.

3. Resolve the problem of excessive overflow from an edge of the prosthesis after injection: The soft material can form a good edge closure, which greatly limits overflow of the resin during injection and facilitates clinical trimming.
4. Improve molding precision: The transparent soft material has good flowability, so that the surface structure of the prosthesis can be finely reproduced; the rigid guide plate shell can limit deformation of the transparent soft material, to improve injection molding precision; the arrangement of the termination point enables the guide plate structure to implement a thinner and more uniform thickness of the soft material, minimizes deformation of the transparent soft material, and implements combination of the transparent silicone rubber and the rigid guide plate shell, to prevent an increase of interfaces from affecting the precision.
5. In the method for processing and manufacturing the guide plate structure, the rigid guide plate shell is obtained through additive manufacturing, and the soft lining is obtained through impression or lamination of a soft material, so that the method has lower costs and low technical sensitivity, and is more popularized and universal.
6. The guide plate structure formed through the manufacturing method of the present disclosure can be applied to restoration of defective parts of a tooth, a plurality of teeth, or a full mouth of teeth, with a wide application range and high restoration quality and precision.

BRIEF DESCRIPTION OF DRAWINGS

The accompanying drawings described herein are used to provide further understanding of embodiments of the present disclosure, and constitute a part of the present application, but does not constitute limitations to the embodiments of the present disclosure. In the accompanying drawings.

DESCRIPTION OF EMBODIMENTS

Figure 1:
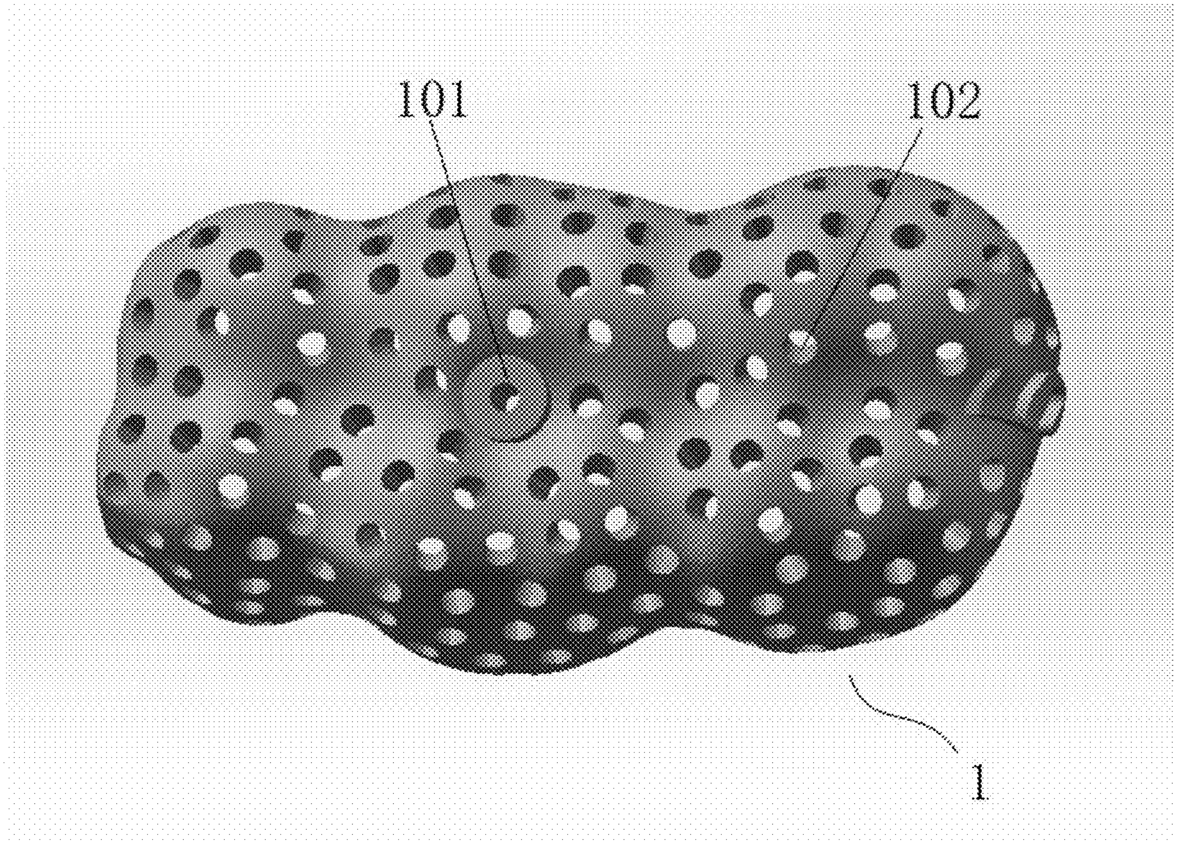
FIG. 1 is a schematic diagram of an outer surface of a rigid guide plate shell in an embodiment of a guide plate structure for injecting a flowable composite resin according to the present disclosure.
Figure 2:
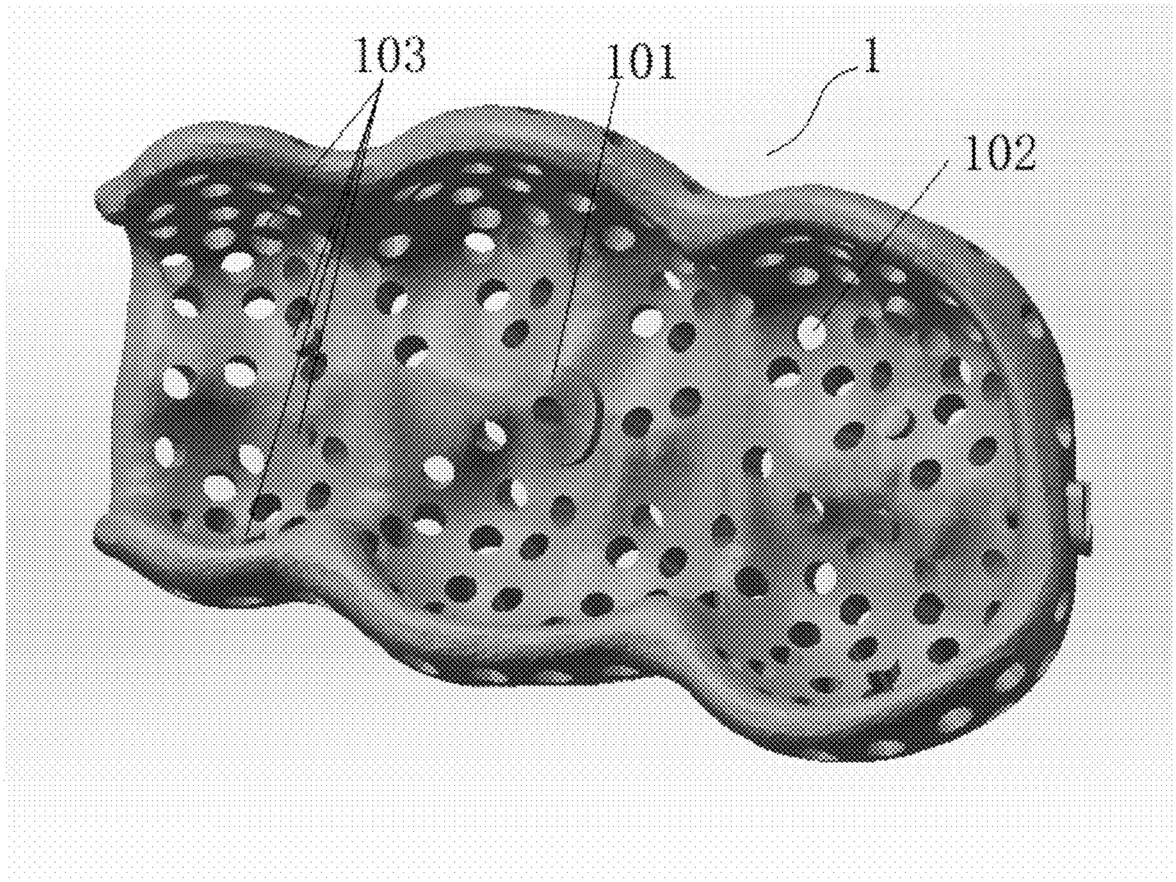
FIG. 2 is a schematic diagram of an inner surface of a rigid guide plate shell in an embodiment of a guide plate structure for injecting a flowable composite resin according to the present disclosure.
Figure 3:
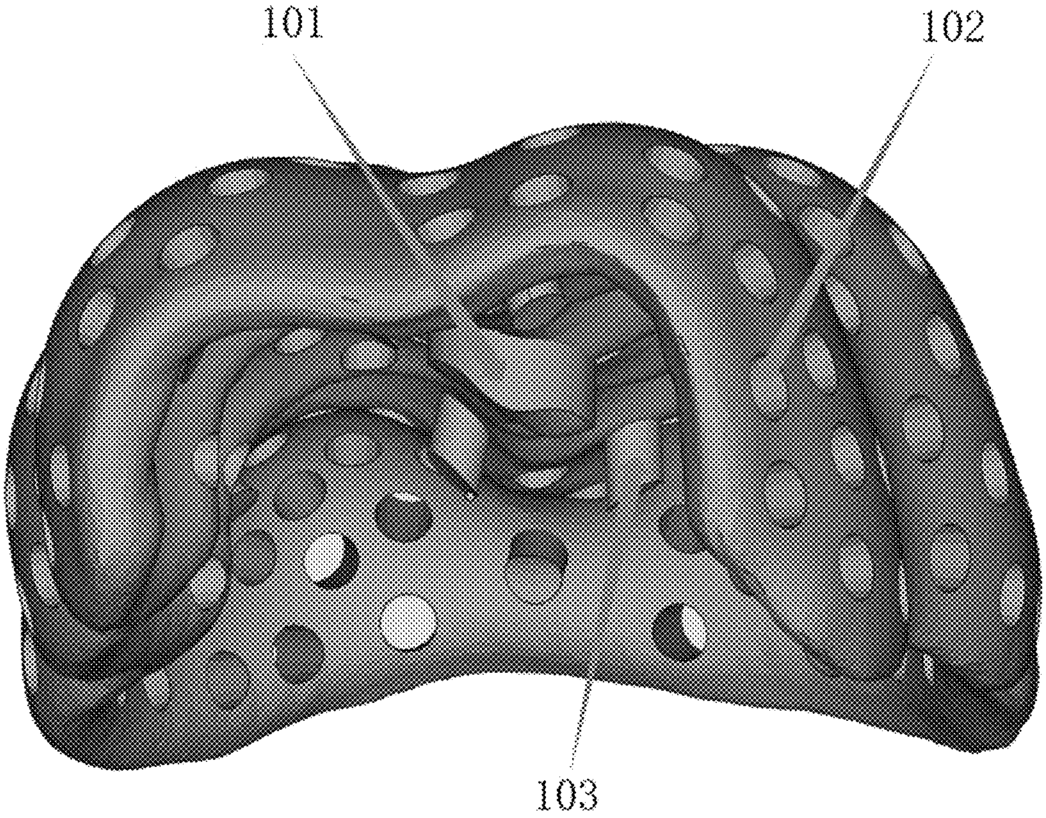
FIG. 3 is a three-dimensional side view of a rigid guide plate shell in an embodiment of a guide plate structure for injecting a flowable composite resin according to the present disclosure.
Figure 4:
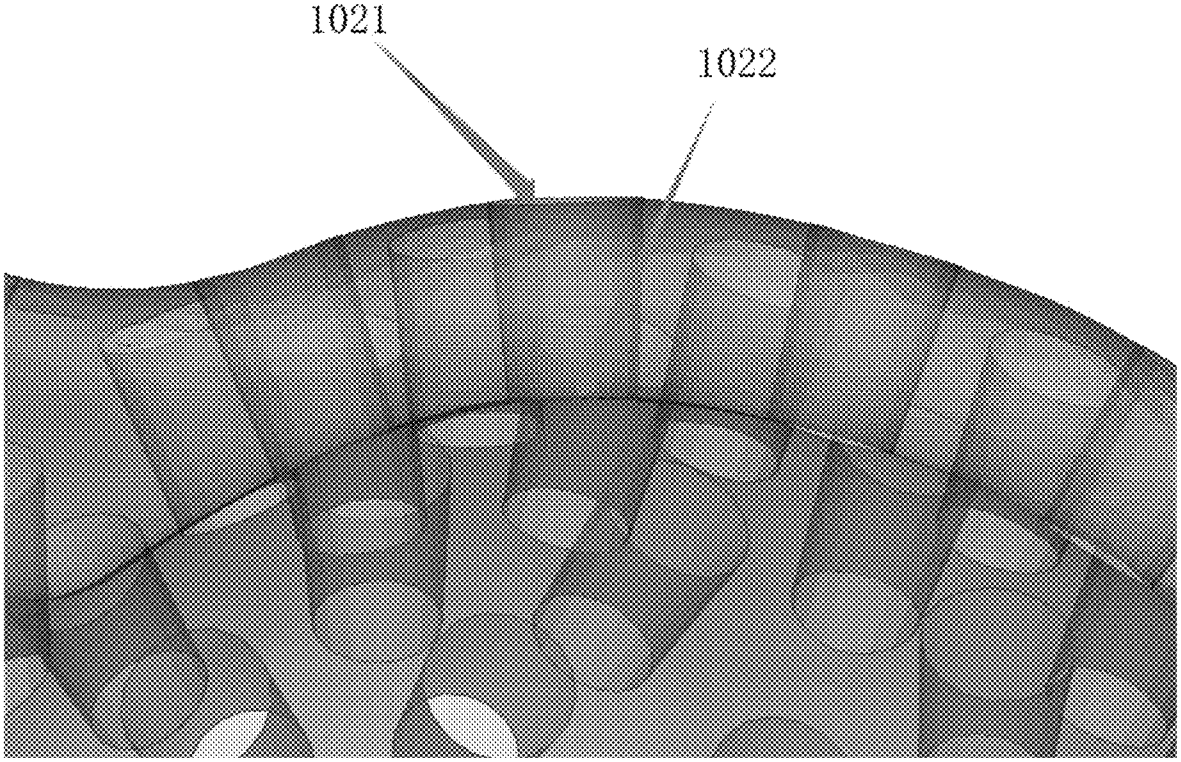
FIG. 4 is a schematic diagram of a structure of overflow holes in an embodiment of a guide plate structure for injecting a flowable composite resin according to the present disclosure.

To make the objectives, technical solutions, and advantages of the present disclosure clearer, the present disclosure is further described in detail below with reference to embodiments and the accompanying drawing. The schematic implementations of the present disclosure and descriptions thereof are only used to explain the present disclosure, but are not intended to limit the present disclosure.

As shown in FIG. 1 to FIG. 6, this embodiment provides a guide plate structure for injecting a flowable composite resin, including a guide plate shell 1 and a lining. The guide plate shell 1 is a rigid guide plate shell 1, the lining is a soft lining, and the lining is elastic and capable of producing certain deformation. In this embodiment, the lining is formed by curing a transparent soft flowable material, the transparent soft flowable material is a transparent silicone rubber material, and is required to have good elasticity, flowability, and light transmittance.

A plurality of overflow holes are formed on the guide plate shell 1. In this embodiment, because the soft lining is formed by using the transparent soft flowable material, the overflow holes are used to provide channels for overflow of the transparent soft flowable material.

A shape of the guide plate shell 1 matches a shape of an intraoral tooth of a patient. The soft lining is located on an inner side of the rigid guide plate shell 1 and fixedly connected to the rigid guide plate shell 1 in an embedded mode. In this embodiment, a part of the material of the soft lining is embedded in the overflow holes in the rigid guide plate shell 1, so that the soft lining and the rigid guide plate shell 1 are mechanically fixed in an embedded mode.

In this embodiment, the overflow holes 102 are evenly distributed on the guide plate shell 1, the overflow holes 102 are conical holes, one end, located on an inner surface of the guide plate shell 1, of the overflow hole 102 is an inner circle 1022, the other end, located on an outer surface of the guide plate shell 1, of the overflow hole 102 is an outer circle 1021, and a diameter of the outer circle 1021 of the overflow hole 102 is larger than that of the inner circle 1022 of the overflow hole 102. The shape of the overflow hole enables the transparent soft flowable material to be embedded in the rigid guide plate shell 1, improving fastness and precision of combination between the soft lining and the guide plate shell 1.

The guide plate shell 1 is provided with an injection channel 101 used for injecting a flowable composite resin. In this embodiment, the injection channel 101 is a channel into which an injection head extends and injects a resin when the flowable composite resin is injected for restoration. A bottom end of the injection channel 101 on the guide plate shell 1 has a shape matching a surface shape of a tooth position in an injection area.

A non-injection area on an inner surface of the lining is provided with a fixing cavity, and an injection area on the inner surface of the lining is provided with a molding cavity. In this embodiment, the non-injection area is a tooth position that does not need to be filled with the flowable composite resin for restoration; the injection area is a tooth position that needs to be filled with the flowable composite resin at a later stage for restoration; the fixing cavity is a space formed by the non-injection area on the inner surface of the transparent soft lining, and is used for fixing and placing the guide plate; and the molding cavity is a space formed by the injection area on the inner surface of the transparent soft lining, and is used for molding a prosthesis when the flowable composite resin is injected for restoration.

In this embodiment, a tooth position in the non-injection area covered by the inner surface of the guide plate shell 1 is provided with a termination point 103, and the termination point 103 is a columnar protrusion in contact with a surface of a non-injection resin restoration area. In this embodiment, each axial surface of each tooth position in the non-injection area is correspondingly provided with a termination point 103, and a bottom end of the termination point 103 matches a surface shape of the tooth position in the non-injection area. The arrangement of the termination point 103 can ensure thickness uniformity of the transparent soft flowable material, and assist in placement and stabilization of the rigid guide plate shell 1.

Figure 7:
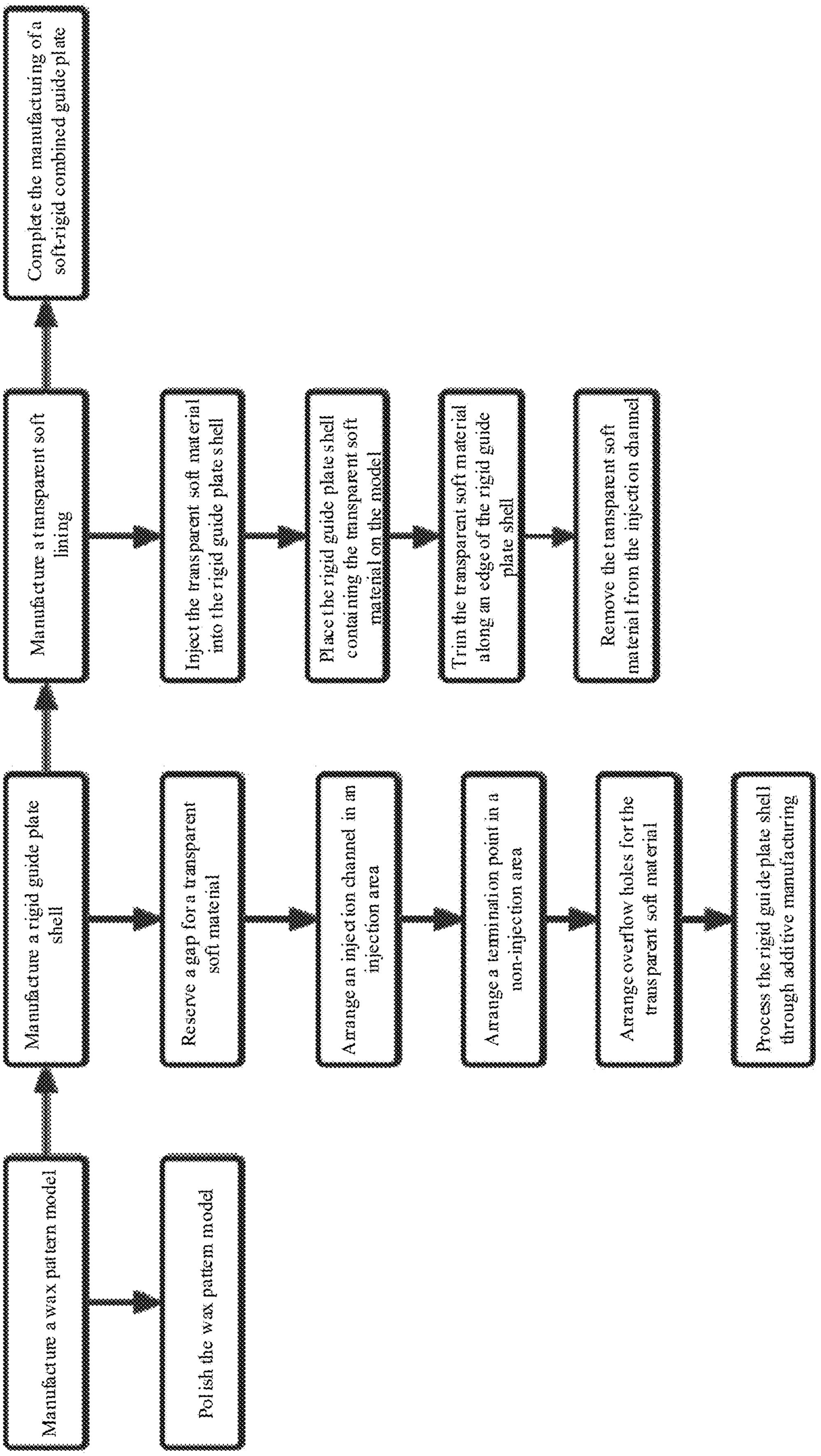
FIG. 7 is a flowchart of manufacturing a guide plate structure for injecting a flowable composite resin according to the present disclosure.

As shown in FIG. 7, an embodiment further provides a method for manufacturing the guide plate structure for injecting a flowable composite resin, including the following steps:

S1. Manufacture a wax pattern model: obtaining intraoral data or an intraoral model of a patient, and manufacturing the wax pattern model based on the obtained data or model, where the wax pattern model in this embodiment is manufactured in a traditional additive sculpting or additive manufacturing manner, and a surface of a to-be-injected tooth position area of the manufactured wax pattern model is polished for later use.

S2. Manufacture a guide plate shell 1:

S21, scanning to obtain data of the wax pattern model, importing the data of the wax pattern model through 3D design software to form a virtual wax pattern, and designing a shape of the guide plate shell 1 according to a standard procedure in the software, where an inner surface of the guide plate shell 1 matches a surface of the virtual wax pattern, that is, a fixing cavity and a molding cavity to be formed when the lining is manufactured later are formed on the inner surface of the guide plate shell 1;

S22, reserving a gap between the guide plate shell 1 and the virtual wax pattern, to reserve a space for the transparent soft lining manufactured later, where in this embodiment, an edge of the rigid guide plate shell 1 needs to be located at a gingival margin, so that the guide plate structure formed later can better match an intraoral tooth structure of the patient, and restoration precision and quality are higher;

S23, designing an injection channel 101, a termination point 103 and overflow holes 102 on the guide plate shell 1, where the injection channel 101 is located at a tooth position in an injection area covered by the guide plate shell 1, and the bottom of the injection channel 101 ends at a surface of a tooth position in an injection area of the virtual wax pattern, so that a bottom end of the injection channel 101 has a shape matching a surface shape of the tooth position in the injection area;

the termination point 103 is located at a tooth position in a non-injection area covered by the guide plate shell 1, and the bottom of the termination point 103 ends at a surface of a non-injection tooth position of the virtual wax pattern, so that a bottom end of the termination point 103 matches a surface shape of the tooth position in the non-injection area, where in this embodiment, the termination point 103 is a columnar protrusion in contact with a surface of a non-injection resin restoration area, each axial surface of each tooth position in the non-injection area is correspondingly provided with a termination point 103, and the arrangement of the termination point 103 ensures thickness uniformity of the soft material, and assists in placement of the rigid guide plate shell 1 on the wax pattern model during manufacturing of the transparent soft lining, thereby improving precision and quality of later tooth restoration; and a plurality of overflow holes 102 are provided, the plurality of overflow holes 102 are evenly distributed on a surface of the guide plate shell 1, and a diameter of an outer circle 1021 of the overflow hole 102 is larger than that of an inner circle 1022 thereof, so that the overflow hole 102 has a shape of a conical hole to ensure that the transparent soft flowable material can be embedded in the rigid guide plate shell 1 after curing; and S24, exporting data of a designed guide plate shell 1, and then processing to manufacture a rigid guide plate shell 1 through resin 3D printing.

Figure 5:
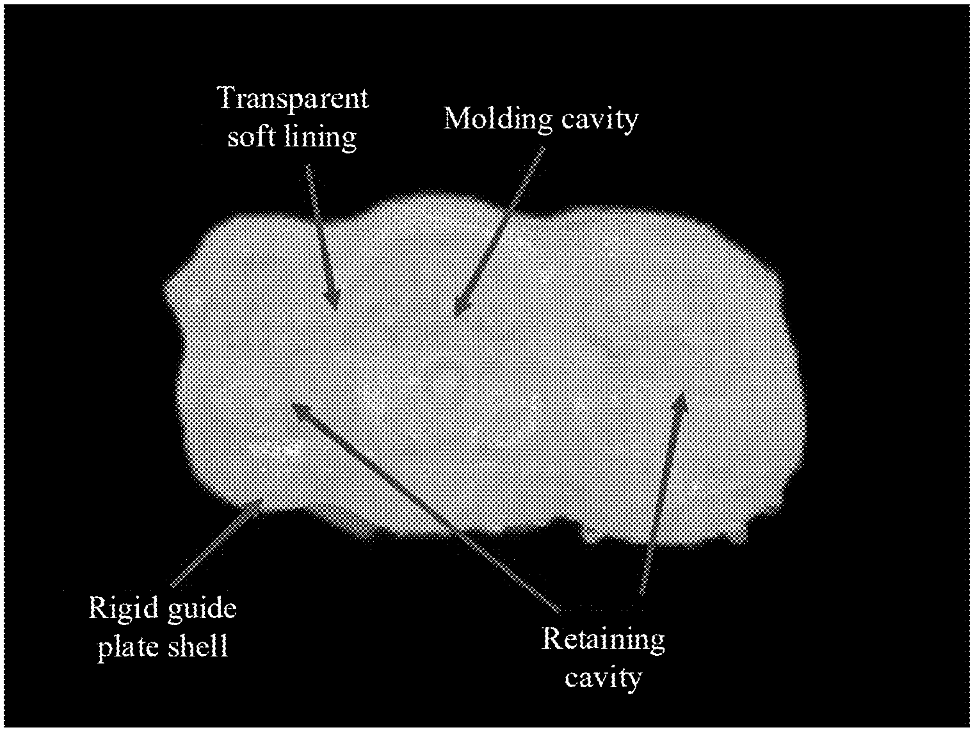
FIG. 5 is a schematic diagram of an inner surface after combination of a soft lining and a rigid guide plate shell in an embodiment of a guide plate structure for injecting a flowable composite resin according to the present disclosure.
Figure 6:
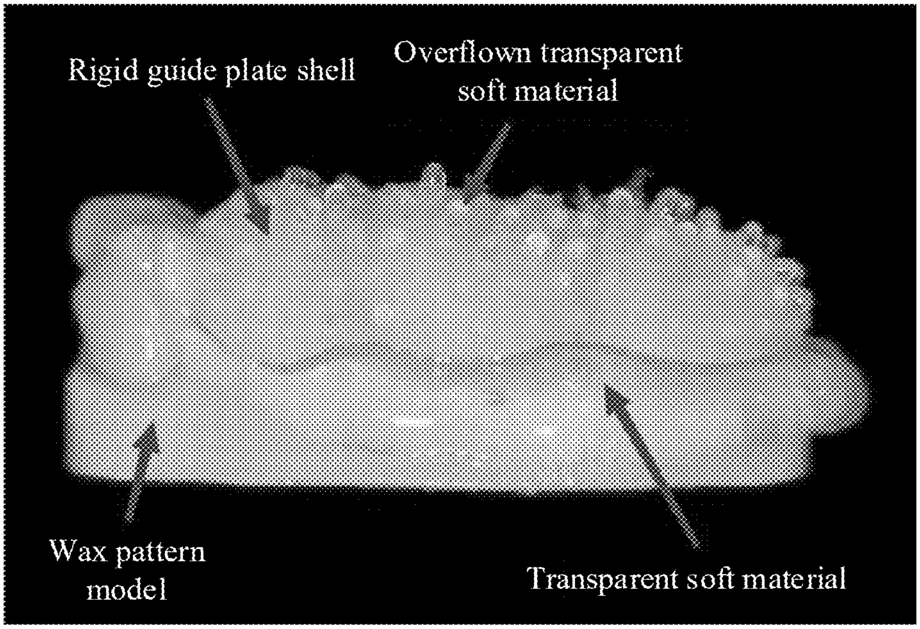
FIG. 6 is a schematic diagram of an outer surface after combination of a soft lining and a rigid guide plate shell in an embodiment of a guide plate structure for injecting a flowable composite resin according to the present disclosure.

S3. Manufacture a lining: before the manufacturing of the lining, a surface of the wax pattern model polished in step S1 needs to be coated with a separating agent and blown dry for later use; and as shown in FIG. 5 and FIG. 6, then injecting a soft flowable material into an inner side of the rigid guide plate shell, where the soft flowable material is a transparent silicone rubber material, and the transparent soft flowable material is required to have good elasticity, flowability, and light transmittance; and turning the guide plate shell 1 containing the soft flowable material through impression or lamination to place the inner side of the guide plate shell 1 on the wax pattern model manufactured in S1, where at this time, the termination point 103 on the guide plate shell 1 is in contact with the surface of the tooth position in the non-injection area on the wax pattern model, the injection channel 101 on the guide plate shell 1 is in contact with the surface of the tooth position in the injection area on the wax pattern model, the soft flowable material is distributed between the rigid guide plate shell 1 and the wax pattern model and is in close fit to form a soft lining, and an excessive soft flowable material overflows from the overflow holes of the guide plate shell 1 to embed the formed soft lining in the guide plate shell 1.

S4. Correct an edge of the guide plate shell 1: after the lining manufactured in S3 is cured, the lining and the guide plate shell 1 are mechanically fixed in an embedded mode, the transparent soft flowable material is firmly fixed on the rigid guide plate shell 1 to form a whole, and a fixing cavity and a molding cavity can be formed on the inner surface of the lining because the lining is fitted to the inner side of the guide plate shell 1; and correction is then performed along the edge of the guide plate shell 1 to remove excessive soft flowable material.

S5. Clean the soft material in the injection channel 101 on the guide plate shell 1 by inserting an injection head, to dredge the injection channel 101, thereby completing the manufacturing of the soft-rigid combined guide plate structure.

A method for using the manufactured guide plate structure is as follows:

During intraoral injection, the soft-rigid combined guide plate structure is placed in a corresponding position on a dentition. At this time, a retaining cavity of the guide plate structure is closely fitted to a tooth position in the non-injection area covered by the guide plate, and a space formed between the molding cavity of the lining and a tooth surface in the injection area covered by the guide plate shell 1 is a space in which a prosthesis is molded during the injection for restoration. Then, an injection head is inserted into the injection channel 101 to inject the flowable composite resin into an area to be restored. In this embodiment, the polished wax pattern model and properties of the transparent soft flowable material are used to obtain a smooth outer surface of an injectable prosthesis, which effectively improves restoration quality and precision.

The manufacturing method in this embodiment can be applied to dental defects of various shapes, sizes, and thicknesses, and can be applicable to restoration of a tooth, a plurality of teeth, or a full mouth of teeth as required, thereby having a wide application range.

The objectives, technical solutions, and beneficial effects of the present disclosure are further described in detail in the foregoing specific implementations. It should be understood that the foregoing descriptions are merely specific implementations of the present disclosure and are not intended to limit the protection scope of the present disclosure. Any modification, equivalent replacement, improvement, and the like made within the spirit and principle of the present disclosure shall fall within the protection scope of the present disclosure.

What is claimed is:

1. A method for manufacturing a guide plate structure for injecting a flowable composite resin, comprising the following steps;

S1, manufacturing a wax pattern model: obtaining intraoral data or an intraoral model of a patient, and manufacturing the wax pattern model based on the obtained data or model;

S2, manufacturing a guide plate shell:

S21, importing data of the wax pattern model through 3D design software to form a virtual wax pattern, and designing a shape of the guide plate shell, wherein an inner surface of the guide plate shell matches a surface of the virtual wax pattern;

S22, reserving a gap between the guide plate shell and the virtual wax pattern;

S23, designing an injection channel, a termination point, and overflow holes on the guide plate shell, wherein the injection channel is located at a tooth position in an injection area covered by the guide plate shell, and a bottom of the injection channel ends at a surface of a tooth position in an injection area of the virtual wax pattern; the termination point is located at a tooth position in a non-injection area covered by the guide plate shell, and a bottom of the termination point ends at a surface of a non-injection tooth position of the virtual wax pattern; and a plurality of overflow holes are provided, and the plurality of overflow holes are distributed on a surface of the guide plate shell; and S24, exporting data of a designed guide plate shell resulting from S23, and then processing to manufacture a rigid guide plate shell through resin 3D printing;

S3, manufacturing a lining: injecting a soft flowable material into an inner side of a rigid guide plate shell through the injection channel, and then turning the guide plate shell containing the soft flowable material through impression to place the inner side of the guide plate shell on the wax pattern model manufactured in S1, wherein at this time, the termination point on the guide plate shell is in contact with the surface of the tooth position in the non-injection area on the wax pattern model, the injection channel on the guide plate shell is in contact with the surface of the tooth position in the injection area on the wax pattern model, the soft flowable material is distributed between the rigid guide plate shell and the wax pattern model and is in close fit to form a soft lining, and an excessive soft flowable material overflows from the overflow holes of the guide plate shell to embed the formed soft lining in the guide plate shell, subsequently, the excess overflowing soft flowable material is removed and the material is cured;

S4, correcting an edge of the guide plate shell: correcting along the edge of the guide plate shell to remove the excessive soft flowable material; and S5, cleaning the soft flowable material in the injection channel on the guide plate shell.

2. The method for manufacturing a guide plate structure for injecting a flowable composite resin according to claim 1, wherein a surface of the wax pattern model is polished before the manufacturing of the lining in step S3, and the surface of the wax pattern model is coated with a separating agent and blown dry for later use.

3. The method for manufacturing a guide plate structure for injecting a flowable composite resin according to claim 1, wherein the edge of the guide plate shell is located at a gingival margin during the manufacturing of the guide plate shell in step S2.

4. The method for manufacturing a guide plate structure for injecting a flowable composite resin according to claim 1, wherein the soft flowable material is a transparent silicone rubber material.

* * * * *